United States Patent
Hsieh et al.

(10) Patent No.: US 12,326,377 B2
(45) Date of Patent: Jun. 10, 2025

(54) METHOD FOR CALIBRATING SENSED FORCE OF TOUCH PAD MODULE

(71) Applicant: Primax Electronics Ltd., Taipei (TW)

(72) Inventors: Chieh-Hung Hsieh, Taipei (TW);
Hsueh-Chao Chang, Taipei (TW);
Sian-Yi Chiu, Taipei (TW); Chao-Wei Lee, Taipei (TW); Wei-Chiang Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 300 days.

(21) Appl. No.: 18/199,294

(22) Filed: May 18, 2023

(65) Prior Publication Data

US 2024/0328885 A1   Oct. 3, 2024

(30) Foreign Application Priority Data

Mar. 31, 2023   (TW) ................ 112112693

(51) Int. Cl.
*G01L 25/00*   (2006.01)
*G06F 1/16*   (2006.01)
(Continued)

(52) U.S. Cl.
CPC .............. *G01L 25/00* (2013.01); *G06F 1/169* (2013.01); *G06F 3/03547* (2013.01); *G06F 3/04142* (2019.05); *G06F 3/0418* (2013.01)

(58) Field of Classification Search
CPC ..... G01L 25/00; G06F 1/169; G06F 3/03547; G06F 3/04142; G06F 3/0418
See application file for complete search history.

(56) References Cited

U.S. PATENT DOCUMENTS 5,854,625 A * 12/1998 Frisch ................ G06F 3/04142
   345/173
8,633,916 B2 * 1/2014 Bernstein .............. G06F 1/1662
   345/174
(Continued)

FOREIGN PATENT DOCUMENTS

CN   107422891 A  * 12/2017
CN   115280267 A  * 11/2022   ......... G06F 3/04142
(Continued)

OTHER PUBLICATIONS

CN-107422891-A; English Translation (Year: 2017).*
(Continued)

*Primary Examiner* — Ryan D Walsh
(74) *Attorney, Agent, or Firm* — KIRTON McCONKIE; Evan R. Witt

(57) ABSTRACT

A method for calibrating sensed force of a touch pad module is provided. The touch pad module includes a touch pad and force sensing elements disposed therebeneath. The method includes: obtaining a force reference table obtained before the touch pad module is assembled with an electronic device, the force reference table including a first data, which includes a first point of the touch pad and first force reference values corresponding to the first point and respectively corresponding to the force sensing elements; placing a calibration block on the first point after the touch pad module is assembled with the electronic device, so the force sensing elements respectively obtain first force test values corresponding to the first point; calculating first compensation ratios according to the first force reference values and the first force test values; and inputting the first compensation ratios into the force reference table.

10 Claims, 3 Drawing Sheets

(51) Int. Cl.
    *G06F 3/0354*     (2013.01)
    *G06F 3/041*     (2006.01)

(56) References Cited

U.S. PATENT DOCUMENTS

| | | | | |
|---|---|---|---|---|
| 9,349,552 | B2* | 5/2016 | Huska | H01H 13/85 |
| 2012/0105358 | A1* | 5/2012 | Momeyer | G06F 3/0485 |
| | | | | 345/174 |
| 2017/0131840 | A1* | 5/2017 | Deichmann | G06F 3/044 |
| 2017/0315650 | A1* | 11/2017 | Reynolds | G06F 3/0416 |
| 2020/0341584 | A1* | 10/2020 | Wang | G06F 3/03547 |

FOREIGN PATENT DOCUMENTS

| | | | | | |
|---|---|---|---|---|---|
| WO | WO-2013008187 | A1 * | 1/2013 | | A61B 5/6892 |
| WO | WO-2022126468 | A1 * | 6/2022 | | G06F 3/016 |

OTHER PUBLICATIONS

CN-115280267-A; English Translation (Year: 2022).*
WO-2013008187-A1; English Translation (Year: 2013).*
WO-2022126468-A1; English Translation (Year: 2022).*

* cited by examiner

METHOD FOR CALIBRATING SENSED FORCE OF TOUCH PAD MODULE

FIELD OF THE INVENTION

The present disclosure relates to a method for calibrating sensed force of a touch pad module, in particular to a method for calibrating sensed force of a touch pad module after the touch pad module is assembled with an electronic device.

BACKGROUND OF THE INVENTION

After a touch pad module is assembled with an electronic device, force sensing results of the touch pad module may change slightly due to a slight error during assembly processes or a slight error of an internal/near structure of the touch pad module, resulting in reducing accuracy of force. Therefore, how to make the touch pad module still have high accuracy of force after it is assembled with the electronic device has become an issue to be solved in this technical field.

SUMMARY OF THE INVENTION

The present disclosure provides a method for calibrating sensed force of a touch pad module, in which the touch pad module includes a touch pad and a plurality of force sensing elements disposed beneath the touch pad. The method includes: obtaining a force reference table obtained before the touch pad module is assembled with an electronic device, the force reference table including a first data, which includes a first point of the touch pad and a plurality of first force reference values corresponding to the first point and respectively corresponding to the force sensing elements; placing a calibration block on the first point of the touch pad after the touch pad module is assembled with the electronic device, so that the force sensing elements respectively obtain a plurality of first force test values corresponding to the first point; calculating a plurality of first compensation ratios according to the first force reference values and the first force test values; and inputting the first compensation ratios into the force reference table.

In some embodiments, the method further includes: placing the calibration block on the first point of the touch pad before the touch pad module is assembled with the electronic device, so that the force sensing elements respectively obtain the first force reference values corresponding to the first point.

In some embodiments, the force reference table further includes a second data, which includes a second point of the touch pad different from the first point and a plurality of second force reference values corresponding to the second point and respectively corresponding to the force sensing elements.

In some embodiments, the method further includes: placing the calibration block on the second point of the touch pad after the touch pad module is assembled with the electronic device, so that the force sensing elements respectively obtain a plurality of second force test values corresponding to the second point.

In some embodiments, the method further includes: calculating a plurality of second compensation ratios according to the second force reference values and the second force test values; and inputting the second compensation ratios into the force reference table.

In some embodiments, the method further includes: placing the calibration block on the first point of the touch pad before the touch pad module is assembled with the electronic device, so that the force sensing elements respectively obtain the first force reference values corresponding to the first point; and placing the calibration block on the second point of the touch pad before the touch pad module is assembled with the electronic device, so that the force sensing elements respectively obtain the second force reference values corresponding to the second point.

In some embodiments, the force reference table further includes a third data, which includes a third point of the touch pad different from the first point and the second point and a plurality of third force reference values corresponding to the third point and respectively corresponding to the force sensing elements.

In some embodiments, the method further includes: calculating the third force reference values based on the first data, the second data and the third point of the touch pad.

In some embodiments, placing the calibration block on the first point of the touch pad is placing the calibration block on the first point of the touch pad by a robot arm.

In some embodiments, the electronic device is a laptop computer.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
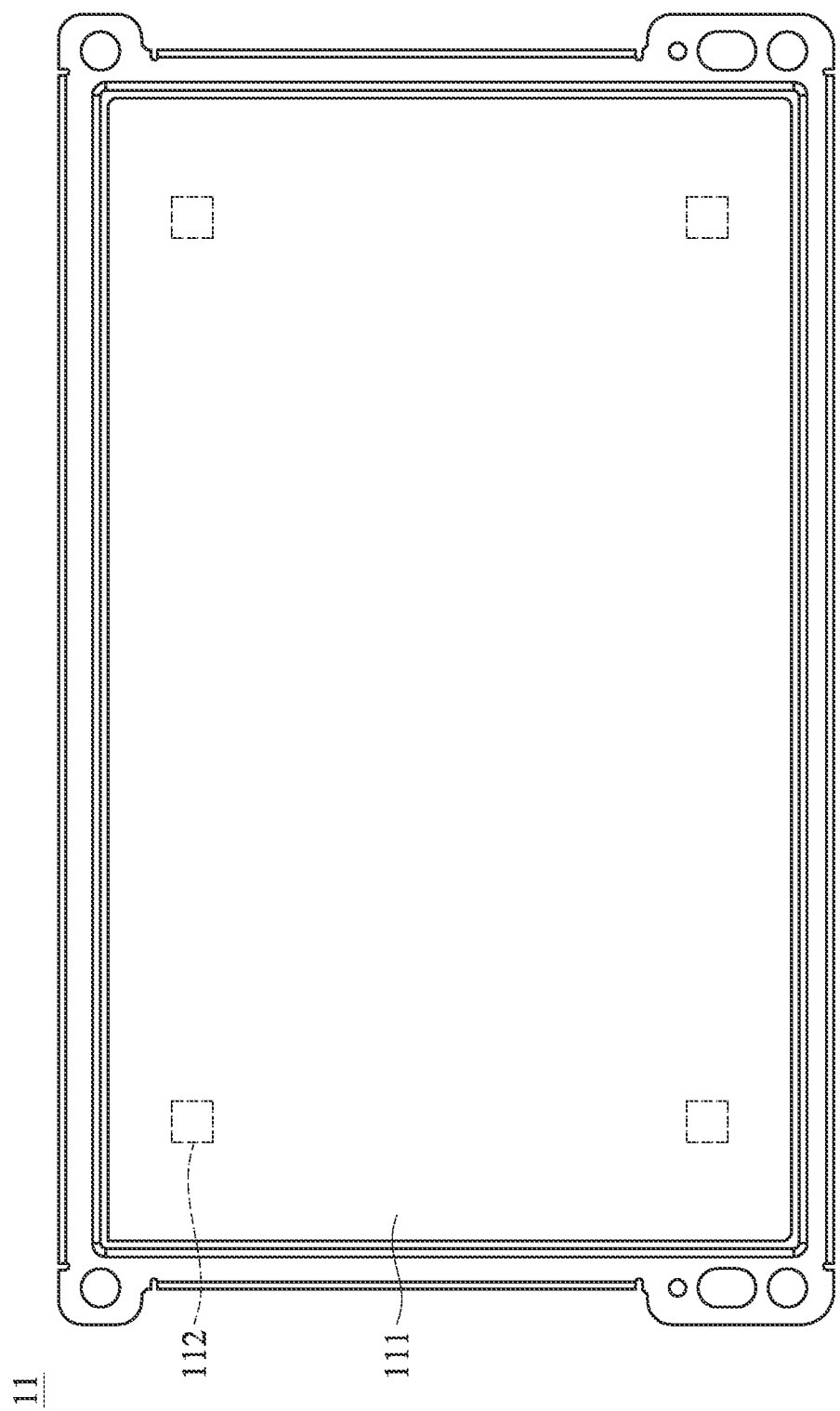
FIG. 1 is a schematic top view of a touch pad module according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, how to make the touch pad module still have high accuracy of force after it is assembled with the electronic device has become an issue to be solved in this technical field. Accordingly, the present invention provides a method for calibrating sensed force of the touch pad module. A force reference table of the touch pad module during a module stage (i.e., before the touch pad module is assembled with the electronic device) is obtained, and force sensing and compensation are performed on the touch pad module during a system stage (i.e., after the touch pad module is assembled with the electronic device) to calibrate the force reference table. As such, the touch pad module of the electronic device can still have high accuracy of force when it is used subsequently. Various embodiments of the method for calibrating the sensed force of the touch pad module of the present invention will be described in detail below.

FIG. 1 is a schematic top view of a touch pad module according to an embodiment of the present invention. As shown in FIG. 1, the touch pad module 11 includes a touch pad 111 and a plurality of force sensing elements 112 (e.g., four force sensing elements 112, but the present invention is not limited thereto), and the force sensing elements 112 are disposed beneath the touch pad 111. When a position of the touch pad 111 is pressed, the force sensing elements 112 may measure the same or different values according to the pressed position and the configuration positions of the force sensing elements 112.

Figure 2:
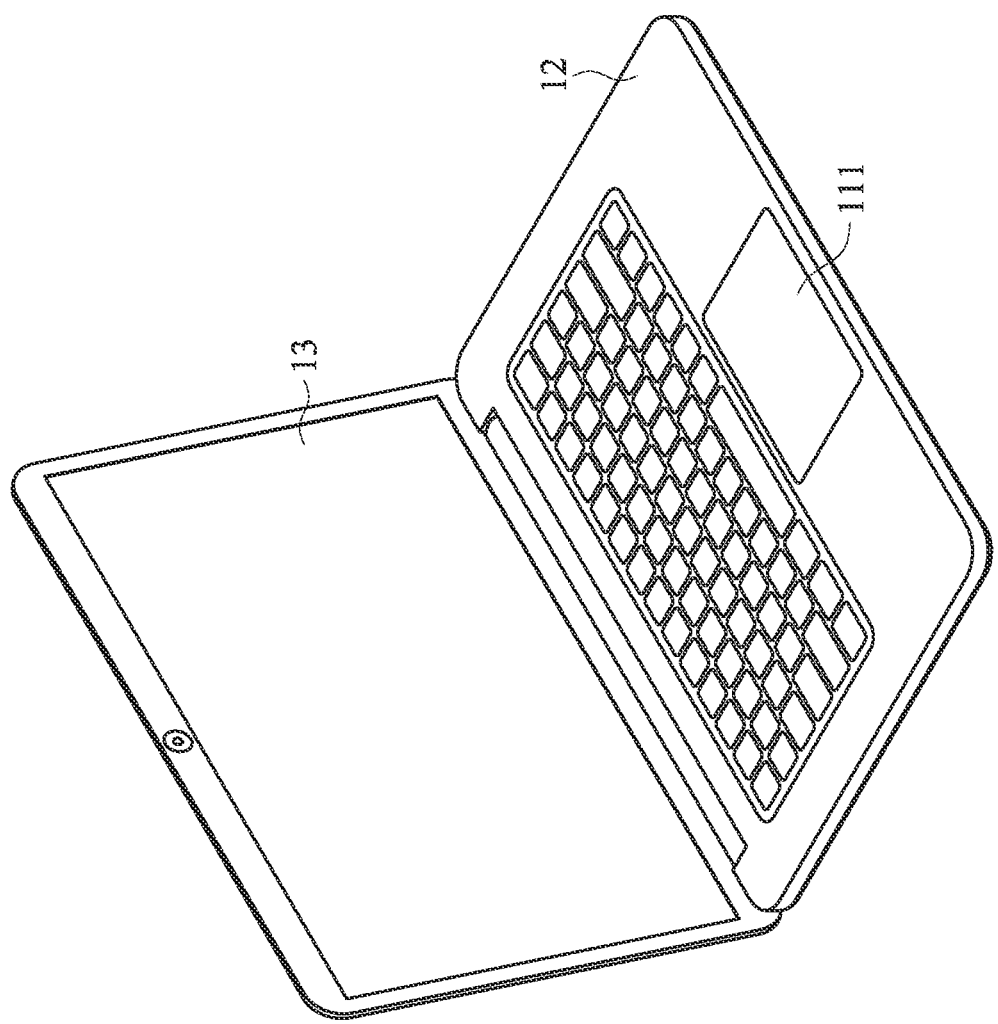
FIG. 2 is a three-dimensional schematic view after a touch pad module is assembled with an electronic device according to an embodiment of the present invention.

FIG. 2 is a three-dimensional schematic view after a touch pad module is assembled with an electronic device according to an embodiment of the present invention. The electronic device 10 may be, for example, a laptop computer, which includes a touch pad module 11 shown in FIG. 1, a casing 12 and a screen 13, and the touch pad module 11 may be assembled in a frame of the laptop computer. However, the present invention is not limited thereto, and the electronic device 10 may be another electronic device that is equipped with the touch pad module 11.

As shown in FIGS. 1 and 2, after the touch pad module 11 is assembled with the electronic device 10, there may be a slight error during assembly processes or a slight error of an internal/near structure of the touch pad module 11, resulting in slight change of force sensing results of the touch pad module 11 and reducing accuracy of force. Accordingly, the present invention provides the method for calibrating the sensed force of the touch pad module 11 as follows.

Figure 3:
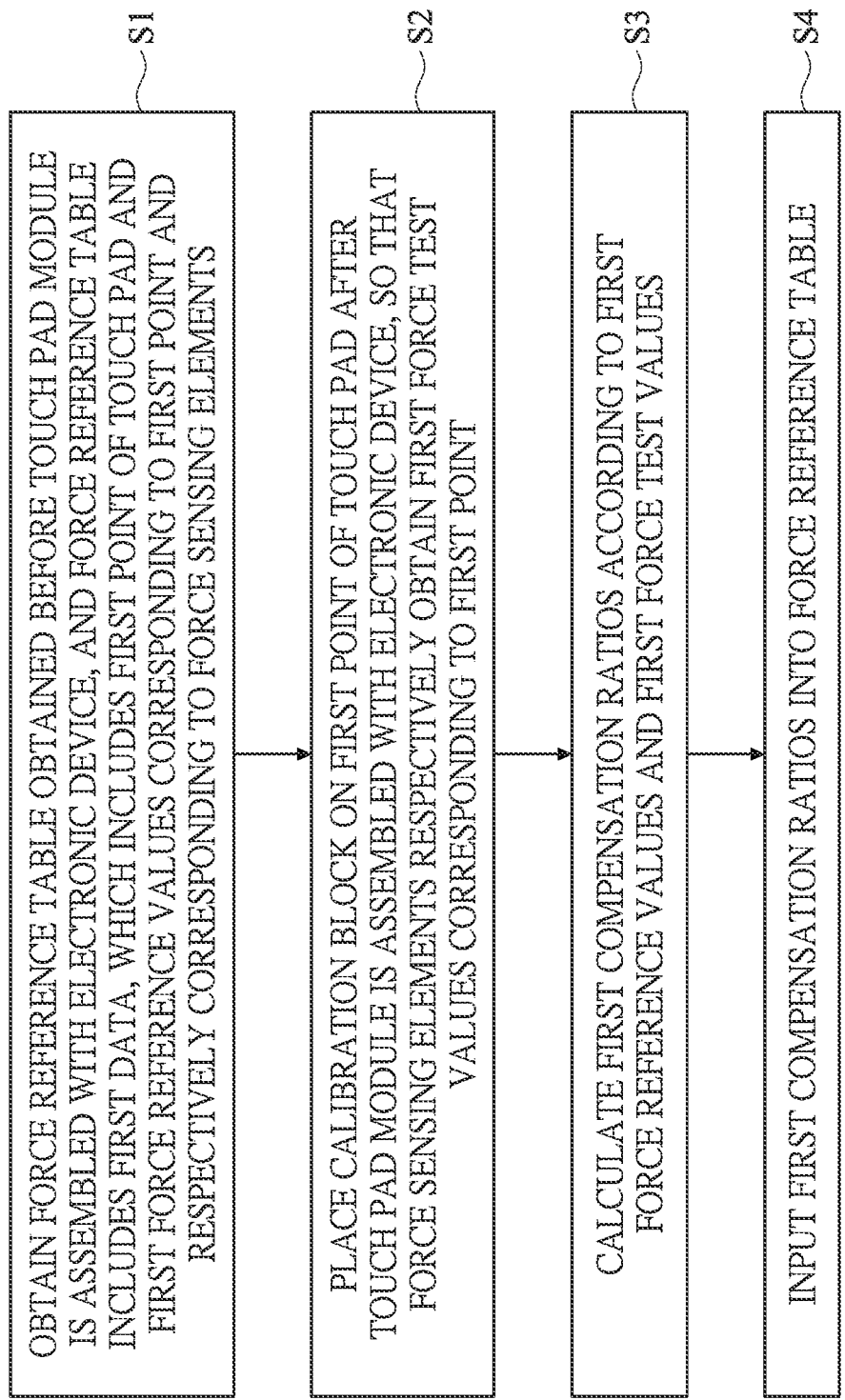
FIG. 3 is a flowchart of a method for calibrating sensed force of a touch pad module according to an embodiment of the present invention.

FIG. 3 is a flowchart of a method for calibrating sensed force of a touch pad module according to an embodiment of the present invention. As shown in FIG. 3, the method includes following steps S1, S2, S3 and S4. Please refer to FIGS. 1 to 3 for detailed descriptions of each step below.

Step S1: a force reference table is obtained, which is obtained before a touch pad module 11 is assembled with an electronic device 10. The force reference table includes a first data. The first data includes a first point (i.e., coordinates/position) of the touch pad 111 and a plurality of first force reference values corresponding to the first point and respectively corresponding to the force sensing elements 112.

The force reference table may include multiple data at different points, and each data includes a point and a plurality of force reference values corresponding to the point and respectively corresponding to the force sensing elements 112. In some embodiments, a number of data may be more than 100, but the present invention is not limited thereto. In some embodiments, the force reference table further includes a second data, and the second data includes a second point of the touch pad 111 different from the first point and a plurality of second force reference values corresponding to the second point and respectively corresponding to the force sensing elements 112. In some embodiments, the force reference table further includes a third data, and the third data includes a third point of the touch pad 111 different from the first point and the second point and a plurality of third force reference values corresponding to the third point and respectively corresponding to the force sensing elements 112.

The force reference values of these data may be obtained by actual testing, calculation or another suitable method. The following embodiments illustrate how to obtain the force reference values by an actual test method. In some embodiments, before the touch pad module 11 is assembled with the electronic device 10, a calibration block (not shown) is placed on the first point of the touch pad 111 (e.g., by a robot arm), so that the force sensing elements 112 respectively obtain the first force reference values corresponding to the first point. In some embodiments, before the touch pad module 11 is assembled with the electronic device 10, the calibration block is placed on the second point of the touch pad 111 (e.g., by a robot arm), so that the force sensing elements 112 respectively obtain the second force reference values corresponding to the second point.

The following embodiments illustrate how to obtain the force reference values by a calculation method. In some embodiments, the third force reference values respectively corresponding to the force sensing elements 112 are calculated (e.g., calculated by an algorithm) based on the first data (including the first point and the first force reference values), the second data (including the second point and the second force reference values) and the third point of the touch pad 111.

Step S2: after the touch pad module 11 is assembled with the electronic device 10, the calibration block is placed on the first point of the touch pad 111, so that the force sensing elements 112 respectively obtain the first force test values corresponding first point. In some embodiments, the calibration block is placed on the first point of the touch pad 111 by a robot arm.

The actual test of step S2 may be applied to different points. In some embodiments, after the touch pad module 11 is assembled with the electronic device 10, the calibration block is placed on the second point of the touch pad 111, so that the force sensing elements 112 respectively obtain second force test values corresponding to the second point. In one example, the actual test may be performed on nine points evenly distributed on the touch pad 111 (referring to FIG. 1, the nine points are, for example, upper left, upper middle, upper right, middle left, middle, middle right, lower left, lower middle and lower right), but the present invention is not limited thereto, and selection of the points of the actual test may be adjusted according to requirements of manufacturing.

Step S3: a plurality of first compensation ratios are calculated according to the first force reference values and the first force test values. For example, when the first force reference value of one of the force sensing elements 112 is signal A, and the first test force value is signal B, the first compensation ratio is signal A/signal B (i.e., the first force reference value/first force test value).

The calculation of the compensation ratio in step S3 may be applied to different points. In some embodiments, a plurality of second compensation ratios are calculated according to the second force reference values and the second force test values. For example, when the second force reference value of one of the force sensing elements 112 is signal C, and the second force test value is signal D, the second compensation ratio is signal C/signal D (i.e., the second force reference value/second force test value).

Step S4: the first compensation ratios are inputted into the force reference table. The first force test value may be corrected back to the first force reference value through the first compensation ratio. For example, the first force test value (signal B)×the first compensation ratio (signal A/signal B) is equal to the first force reference value (signal A).

The input of the compensation ratio in step S4 may be applied to different points. In some embodiments, the second compensation ratios are inputted into the force reference table. The second force test value may be corrected back to the second force reference value through the second compensation ratio. For example, the second force test value (signal D)× second compensation ratio (signal C/signal D) is equal to the second force reference value (signal C).

As such, when the touch pad module 11 of the electronic device 10 is subsequently used by the user, it can still have high accuracy of force. For example, when the first point of the touch pad 111 is pressed, and the force sensing element 112 senses signal E, signal E can be corrected as (signal E)×(signal A/signal B), which has high accuracy of force.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A method for calibrating sensed force of a touch pad module, wherein the touch pad module comprises a touch pad and a plurality of force sensing elements disposed beneath the touch pad, the method comprising:
    obtaining a force reference table obtained before the touch pad module is assembled with an electronic device, the force reference table including a first data, which includes a first point of the touch pad and a plurality of first force reference values corresponding to the first point and respectively corresponding to the force sensing elements;
    placing a calibration block on the first point of the touch pad after the touch pad module is assembled with the electronic device, so that the force sensing elements respectively obtain a plurality of first force test values corresponding to the first point;
    calculating a plurality of first compensation ratios according to the first force reference values and the first force test values; and
    inputting the first compensation ratios into the force reference table.

2. The method of claim 1, further comprising:
    placing the calibration block on the first point of the touch pad before the touch pad module is assembled with the electronic device, so that the force sensing elements respectively obtain the first force reference values corresponding to the first point.

3. The method of claim 1, wherein the force reference table further includes a second data, which includes a second point of the touch pad different from the first point and a plurality of second force reference values corresponding to the second point and respectively corresponding to the force sensing elements.

4. The method of claim 3, further comprising:
    placing the calibration block on the second point of the touch pad after the touch pad module is assembled with the electronic device, so that the force sensing elements respectively obtain a plurality of second force test values corresponding to the second point.

5. The method of claim 4, further comprising:
    calculating a plurality of second compensation ratios according to the second force reference values and the second force test values; and
    inputting the second compensation ratios into the force reference table.

6. The method of claim 3, further comprising:
    placing the calibration block on the first point of the touch pad before the touch pad module is assembled with the electronic device, so that the force sensing elements respectively obtain the first force reference values corresponding to the first point; and
    placing the calibration block on the second point of the touch pad before the touch pad module is assembled with the electronic device, so that the force sensing elements respectively obtain the second force reference values corresponding to the second point.

7. The method of claim 6, wherein the force reference table further includes a third data, which includes a third point of the touch pad different from the first point and the second point and a plurality of third force reference values corresponding to the third point and respectively corresponding to the force sensing elements.

8. The method of claim 7, further comprising:
    calculating the third force reference values based on the first data, the second data and the third point of the touch pad.

9. The method of claim 1, wherein placing the calibration block on the first point of the touch pad is placing the calibration block on the first point of the touch pad by a robot arm.

10. The method of claim 1, wherein the electronic device is a laptop computer.

* * * * *